June 5, 1951   A. C. SACHSE ET AL   2,556,004
MAGNETIC COUPLING
Filed July 31, 1946   3 Sheets-Sheet 1
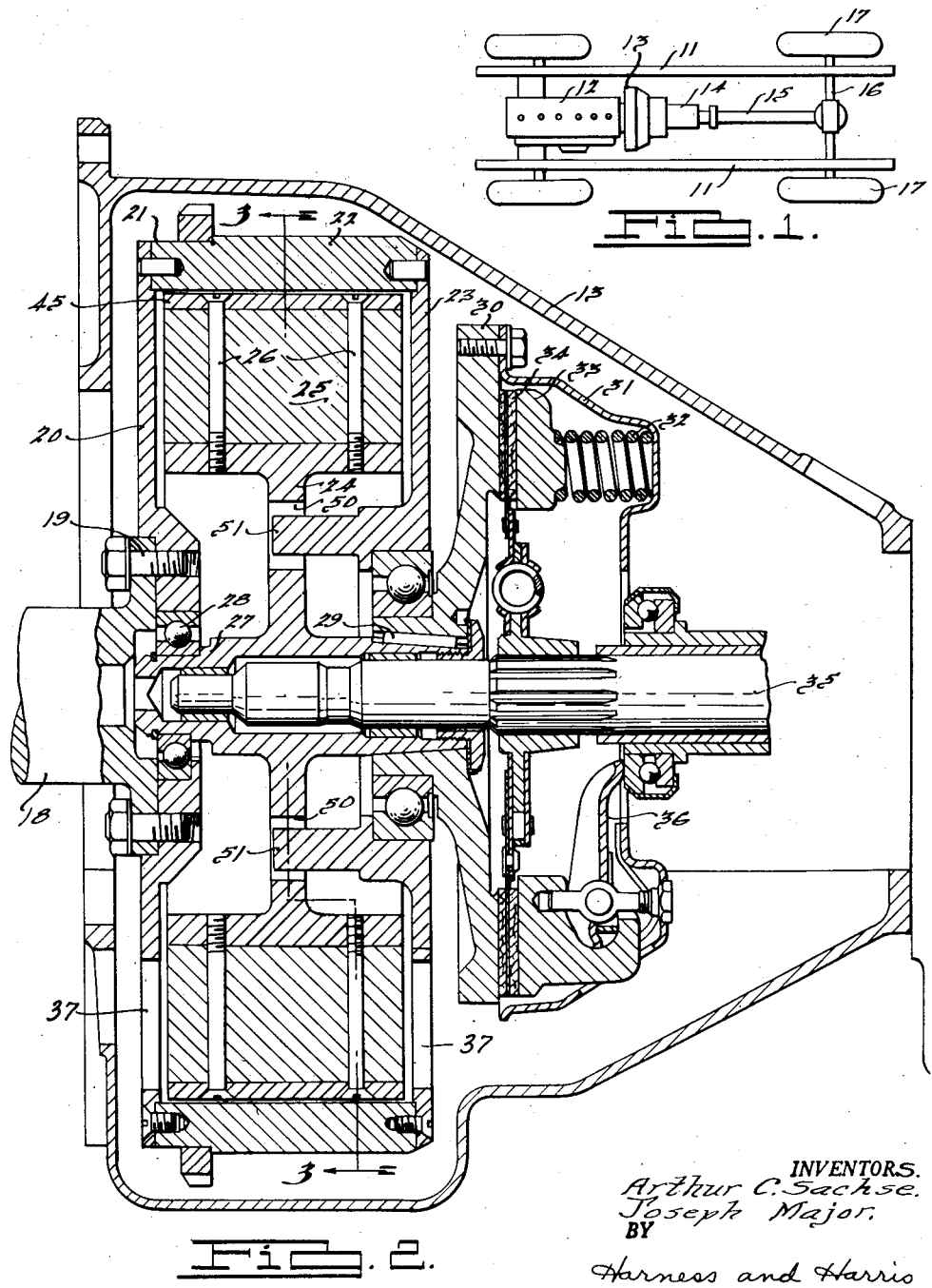
INVENTORS.
Arthur C. Sachse.
Joseph Major.
BY
Harness and Harris
ATTORNEYS.

June 5, 1951  A. C. SACHSE ET AL  2,556,004
MAGNETIC COUPLING

Filed July 31, 1946  3 Sheets-Sheet 2

INVENTORS.
Arthur C. Sachse,
Joseph Major.
BY
Harness and Harris
ATTORNEYS.

June 5, 1951 A. C. SACHSE ET AL 2,556,004
MAGNETIC COUPLING
Filed July 31, 1946 3 Sheets-Sheet 3
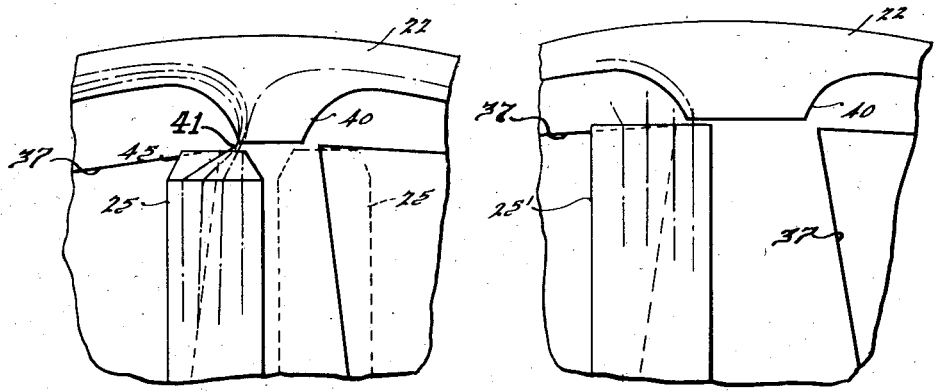
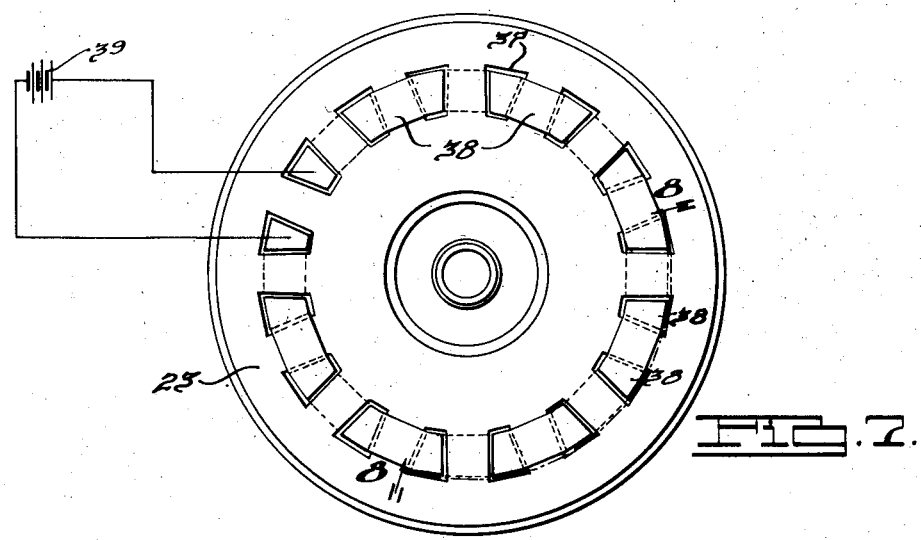
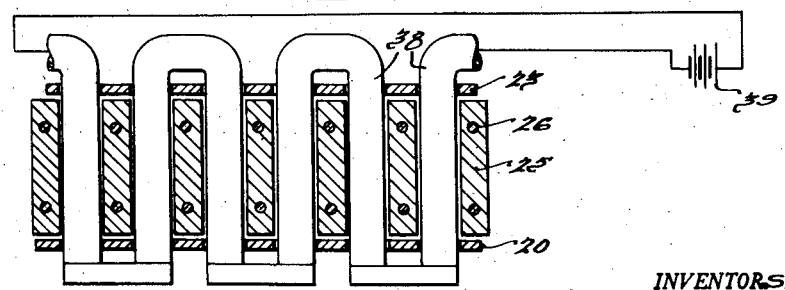
INVENTORS.
Arthur C. Sachse.
Joseph Major.
BY
Harness and Harris
ATTORNEYS.

Patented June 5, 1951

2,556,004

UNITED STATES PATENT OFFICE 2,556,004

MAGNETIC COUPLING

Arthur C. Sachse and Joseph Major, Detroit, Mich., assignors to Chrysler Corporation, Highland Park, Mich., a corporation of Delaware Application July 31, 1946, Serial No. 687,441

3 Claims. (Cl. 172—284)

This invention relates to a magnetic coupling for the transmission of power from a driving member to a driven member possessing limited flexibility for the absorption of shock, and more particularly to means for utilizing substantially the maximum intensity of residual magnetism or remanence obtained by magnetization of coupling parts.

A known phenomenon of magnetism is utilized in the coupling to be described herein. Hysteresis loops used by physicists to describe the effects of magnetization and subsequent demagnetization of objects show that increasing an inducing electric current from zero to a maximum and then reducing it to zero leaves the magnetized objects with an original flux density or remanence of an appreciable amount although somewhat less than the maximum or saturated flux density obtained when the current was on. Further reduction of the inducing current by reversing its direction or producing the same effect by substantially increasing the air gap between magnetized objects results in a further reduction of flux density. Restoration of the original air gap (or removal of the reversed electric current) produces a minor hysteresis loop which shows a considerably less flux density or remanence than the original remanence referred to above in the magnetized objects. It therefore follows that the mechanical force necessary to separate magnetized objects is greater immediately after magnetization and removal of the magnetizing influence than after successive reductions of the remanence or "breaks of the flux lines" and their restoration. Experiments have shown that the reestablished lines of flux possess only in the neighborhood of one-half the strength of the original lines of flux between the magnetized objects. It is an object of my invention to apply this phenomenon to a magnetic coupling that is mechanically assembled, then magnetized and used to provide limited relative movement to act as a cushion between its components without breaking the flux lines of the original residual magnetism or remanence. The coupling is constructed so that the residual magnetism or remanence which limits relative motion between coupling components possesses greater strength than the maximum torque ever transmitted by the driving member of the coupling. It is thus assured that the unrestricted relative movement of coupling components will never occur. The utilization of the phenomenon referred to above permits the desired magnetic strength to be obtained in a smaller coupling than would otherwise be required.

The transmission of torque through an air gap by means of magnetism possesses the desirable feature of eliminating the transfer of shock transmitted by the driving or driven member to the other member. Where the coupling is used in conjunction with motor vehicles the road shock transmitted as torque back through the drive shaft would not be transmitted through the novel coupling to the engine. Where the coupling is used in the power train of machine tools, for example, in the driving mechanism of a reamer, chatter of the tool on the work would not be transmitted back to the motor.

It is a further object of the invention to provide each magnetic pole tip with a medium which facilitates the bending of magnetic lines of flux as an incident to relative movement of mated coupling parts, and thereby to direct the lines of flux toward the adjacent pole and to have the component of force tending to resist relative movement of the coupling parts increase with the deflection of flux lines so that the further apart that the coupling parts become within the limits of their relative movement, the greater is the force tending to bring them back together.

It is a further object of this invention to predetermine the limits of relative movement of coupling components for a given torque by shaping the magnetic pole tips.

A resilient coupling is provided herein that never slips beyond a predetermined limit and does not operate in the manner of a spring cushioned coupling. The latter has a rebound which overrides the original static position and thereby oscillates. The coupling herein described is drawn back to its original static position after removal of load and not beyond this position.

In the drawings:

Fig. 1 is a plan view of a motor vehicle chassis showing one application of the invention;

Fig. 2 is a vertical section through the magnetic coupling and friction clutch as used in the motor vehicle of Fig. 1;

Fig. 5 is a view showing the tip construction of one magnet;

Fig. 6 is a view of a straight sided magnet to be contrasted with the Fig. 5 construction;

Fig. 7 is an elevational view showing the coupling being magnetized; and

Fig. 8 is a section on the line 8—8 of Fig. 7.

Figure 3:
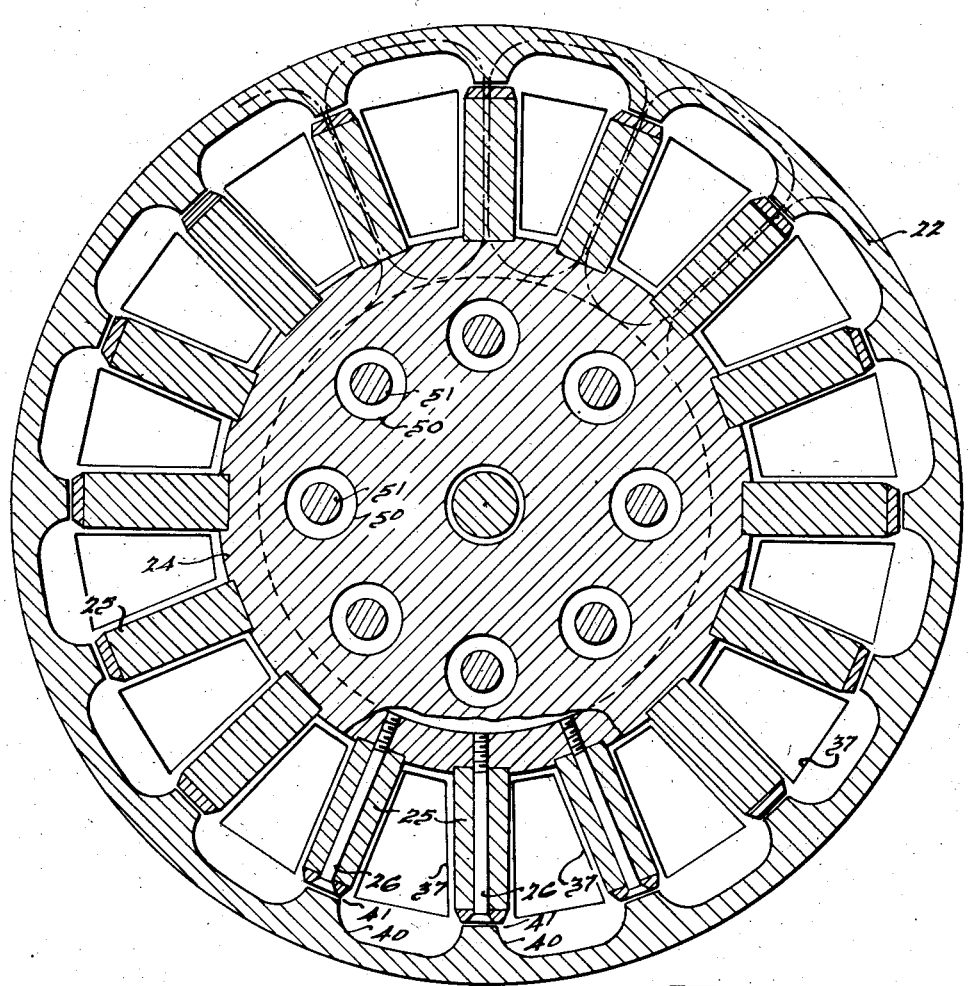
Fig. 3 is a section on the line 3—3 of Fig. 2.

The coupling will be described in conjunction with an automotive vehicle which is a typical application of the invention, but it is to be understood that it could be used in other power transmission mechanisms.

Referring to Fig. 1 an automobile chassis is illustrated as comprising a frame 11 having an engine 12, coupling and clutch housing 13 and transmission 14 therein. Drive shaft 15 and rear axle 16 transmit the engine torque to the rear driving wheels 17.

Referring to Figs. 2 and 3, the magnetic coupling operatively connecting the engine 12 and transmission 14 is shown in more detail. Driving shaft 18, which is the crankshaft of engine 12, is connected by bolts 19 to the radial element 20 of the flywheel 21. The flywheel 21 in this construction has a hollow cylindrical form with an annular element or ring 22 supported by radial elements 20 and 23. The flywheel is rotated with crankshaft 18 and comprises the driving element of the coupling to be described herein.

The driven element of the coupling is located within the flywheel 21 and comprises a rotor 24 having a plurality of magnetic elements 25 projecting radially therefrom. The elements 25 are secured to the rotor 24 at spaced intervals around its circumference by non-magnetic anchor screws 26. The rotor 24 has a hub portion 27 formed adjacent its central portion which is supported by bearing 28. The after portion of rotor 24 is keyed at 29 to the usual clutch driving plate 30 which supports a clutch cover 31, pressure springs 32 and pressure plate 33. A clutch driving disc 34 is splined to a transmission drive pinion shaft 35. A clutch release lever 36 in combination with pressure springs 32 controls the engagement and disengagement of the clutch. The clutch forms no part of the invention and has been briefly referred to to show the relation of the novel coupling to the operative motor vehicle components.

The radial elements 20 and 23 are formed of non-magnetic metal to confine the lines of magnetic force within the coupling and are provided with preformed openings 37 spaced between the magnetic elements 25. The function of the preformed openings 37 will be described herein.

Figure 4:
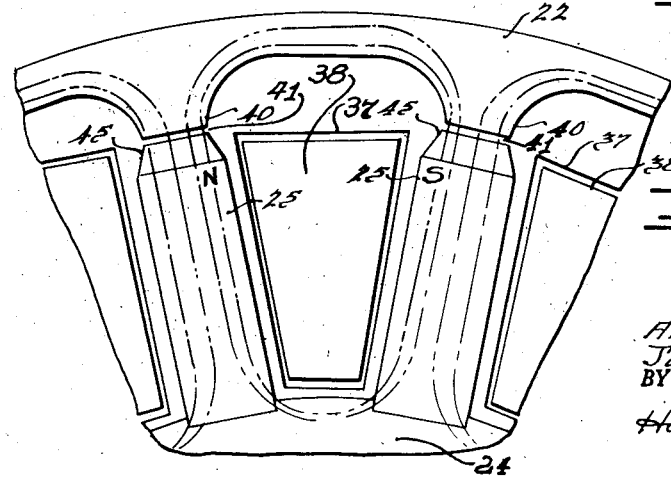
Fig. 4 is a diagrammatic view showing the magnetic circuits.

In the assembly of the coupling the flywheel 21 which serves as a driving member and the rotor 24 with its magnetic elements 25 thereon which serves as a driven member are mechanically assembled as a unit which may be held on a fixture preparatory to magnetization thereof. Spacers such as wooden or brass shims may be used to fix the air gap 41 between the magnetic elements 25 and the ring 22. Electrical conductors 38 are then inserted through openings 37 between each pair of magnetic elements 25. The projecting ends of conductors 38 are connected to make the path of electric current a continuous but winding path as shown in Fig. 8. A direct current is then sent through the conductors 38 as from battery 39 to effect an in situ magnetization of the elements 25. The openings 37 and conductors 38 are shown as having a trapezoidal shape. Any shape may be utilized although the air gap between the conductors 38 and magnetic elements 25 should be kept at a minimum. As shown in Fig. 4 the current in adjacent conductors 38 is flowing in opposite directions and each magnetic element 25 is subjected to the magnetic influence of its two adjacent conductors which are positioned on each side of the magnetic element 25. The elements 25 are magnetized and the magnetic influences imparted thereto by the adjacent conductors are additive because of the oppositely directed current and the relative positions of the conductors. When the elements are saturated or when a desired magnetic influence has been imparted to the elements 25 the current may be shut off and the conductors 38 removed from the openings 37 and the shims removed and the coupling assembly may then be assembled into the clutch housing as shown in Fig. 2. Magnetic lines of flux are travelling under these conditions in paths represented by the dot and dash lines of Figs. 3 and 4. The residual magnetism retained in the component coupling parts has a flux density of considerable magnitude although somewhat less than the maximum or saturation achieved while the current was on. This is a recognized phenomenon and is explained by reference to hysteresis curves. It is important that these established flux lines never be "broken" once the magnetization is completed, for if they are "broken" and reestablished the flux density will approximate only one-half of its present strength.

The magnetism under no load conditions tends to maintain the magnetic elements 25 aligned with the spaced magnetically attractable portions 40 provided on the adjacent surface of the ring and resists any tendency to cause relative rotation between flywheel 21 and ring 22. Referring to Fig. 5 the magnetic element 25 is shown in solid lines in the position it assumes when the engine 12 is driving the vehicle. When the vehicle is driving the engine the element 25 assumes the position shown in dotted lines. When torque from the engine is imparted by driving shaft 18 to the flywheel 21 the flywheel 21 and ring 22 tend to move toward the right in Fig. 5 carrying portions 40 to the right. The magnetic attraction of element 25 for portion 40 tends to drag element 25 along with portion 40 and rotate rotor 24 thereby driving the clutch driving plate 30. However, the force required to move the vehicle resists rotation of rotor 24 and a relative movement between the element 25 and portion 40 is initiated. By means to be described herein deflection of the flux lines is facilitated and as the relative movement increases the force resisting relative motion increases for reasons to be explained herein. The force resisting the relative movement increases until an equilibrium is obtained and the rotor is carried along with the flywheel but with a slight lag as diagrammatically illustrated in Fig. 5. A similar but reversed set of facts occurs when the vehicle drives the engine.

In the preferred construction of the device the magnetic elements 25 are formed of Alnico V which is an alloy of aluminum, nickel and cobalt supplied by the General Electric Company and having a relatively low magnetic permeability. This alloy has a relatively high magnetic reluctance and the magnetic lines of flux in a material of high reluctance do not readily "bend" or deflect. Therefore, if the entire magnetic element 25 is made of Alnico V or other material of high reluctance when there is a relative displacement of the element 25' (see Fig. 6) relative to the portion 40 the flux lines are dissipated over the entire upper surface of the element 25', and have substantially no deflection before reaching the surface. When the element 25' is displaced with only a small portion of its surface area aligned with portion 40 the majority of the flux lines in reaching ring 22 are forced to cross a greatly enlarged air gap and their strength is materially reduced. In addition these latter flux lines do not possess the large tangential component of force possessed by deflected lines as shown in Fig. 5. To remedy this and permit the flux to deflect toward portion 40, a shoe 45 of material having a high permeability and low reluctance such as cold rolled steel, is provided on the end of each of the elements 25. The flux lines may deflect in this medium and thus substantially all be concentrated on the portion 40 thereby increasing the magnetic force resisting relative movement of rotor and flywheel as compared to a construction of the type shown in Fig. 6.

In addition, the shoes 45 are tapered so that the outer end thereof has a reduced area. The reduction in area establishes the limits of relative motion between rotor and flywheel for a given torque. The smaller the area provided on the outer end of the elements 25 the greater the magnetic pull exerted between the elements 25 and their respective portions 40. This phenomenon results from the fact that magnetic force is a function of the area and the square of the flux density. Thus as the area is decreased this is more than overcome by the effect of the increase in flux density which is squared. This same relationship between pole area and flux density explains that as an element 25 and its portion 40 are moved relative to each other the force of attraction between them increases until a maximum is reached as a minimum of their respective end areas are radially aligned. The concentration of flux in a limited area causes the force to increase as the aligned areas are reduced. This effect is, of course, only obtained where the shoe of low reluctance material is employed to direct the flux lines to the aligned areas. Since the maximum force is obtained as the aligned areas reach their minimum (as shown in Fig. 5) the amount of relative rotation between ring and rotor is less with the tapered pole shoes than with the full width elements illustrated in Fig. 6.

Means to mechanically limit any relative rotation resulting from an overloading of the coupling have been provided herein. The rotor 24 is provided with a plurality of openings 50 therein. Radial element 23 of the flywheel 21 is provided with a plurality of fingers 51 penetrating openings 50. The openings 50 and fingers 51 are so proportioned in size that the fingers will engage rotor 24 when the limit of the desired relative rotation has occurred and thereby mechanically force the rotor to be carried along with the flywheel and prevent the magnetic circuits from being interrupted.

We claim:

1. A coupling adapted to be incorporated as a unitary assembly into the driving mechanism of a motor vehicle, said assembly comprising a driving member and a driven member mounted for relative rotation about an axis, one of said members comprising a rotor having a plurality of spaced in situ magnetized pole elements associated therewith and the other of said members comprising an annular flywheel element surrounding said rotor and having a pair of axially spaced radial portions supporting said flywheel element on said axis, said axially spaced radial portions being located on opposite sides of said rotor and each of said radial portions having a plurality of openings provided therein through which access to said pole elements may be obtained to perform said in situ magnetization after said driving and driven members have been assembled.

2. A coupling adapted to be incorporated as a unitary assembly into the driving mechanism of a motor vehicle, said assembly comprising a driving member and a driven member mounted for relative rotation about an axis, one of said members comprising a rotor having a plurality of spaced in situ magnetized pole elements associated therewith and the other of said members comprising an annular flywheel element surrounding said rotor and having a pair of axially spaced radial portions supporting said flywheel element on said axis, said axially spaced radial portions being located on opposite sides of said rotor, each of said radial portions having a plurality of openings provided therein through which access to said pole elements may be obtained to perform said in situ magnetization after said driving and driven members have been assembled, said rotor and one of said radial portions being provided with cooperating openings and fingers adapted to limit relative rotation between said rotor and said flywheel element.

3. A coupling adapted to be incorporated as a unitary assembly into the driving mechanism of a motor vehicle, said assembly comprising a driving member and a driven member mounted for relative rotation about an axis, one of said members comprising a rotor having a plurality of spaced in situ magnetized pole elements associated therewith and the other of said members comprising an annular flywheel element surrounding said rotor and having a pair of axially spaced radial portions supporting said flywheel element on said axis, said axially spaced radial portions being located on opposite sides of said rotor, each of said radial portions having a plurality of openings provided therein through which access to said pole elements may be obtained to perform said in situ magnetization after said driving and driven members have been assembled, said rotor being provided with an opening and one of said radial portions being provided with an axially extending finger which penetrates said opening, said opening and said finger being so proportioned in diameter that they serve as a lost motion mechanical connection between said rotor and said last-mentioned radial portion to limit relative rotation therebetween.

ARTHUR C. SACHSE.
JOSEPH MAJOR.

REFERENCES CITED

The following references are of record in the file of this patent:

UNITED STATES PATENTS

| Number | Name | Date |
| --- | --- | --- |
| 280,322 | Nash | June 26, 1883 |
| 473,042 | Willans | Apr. 19, 1892 |
| 519,597 | Wetmore | May 8, 1894 |
| 1,308,435 | Maire | July 1, 1919 |
| 1,823,326 | Legg | Sept. 15, 1931 |
| 2,056,177 | Erbguth | Oct. 6, 1936 |
| 2,075,488 | Wagar | Mar. 30, 1937 |
| 2,133,686 | Cox | Oct. 18, 1938 |
| 2,170,892 | Cox | Aug. 29, 1939 |
| 2,212,192 | Howell | Aug. 20, 1940 |
| 2,300,778 | Cornwell | Nov. 3, 1942 |
| 2,346,904 | Carlson | Apr. 18, 1944 |
| 2,392,148 | Hornbostel | Jan. 1, 1946 |
| 2,435,112 | Wightman | Jan. 27, 1948 |
| 2,498,244 | Bromfield | Feb. 21, 1950 |